Figure 1:
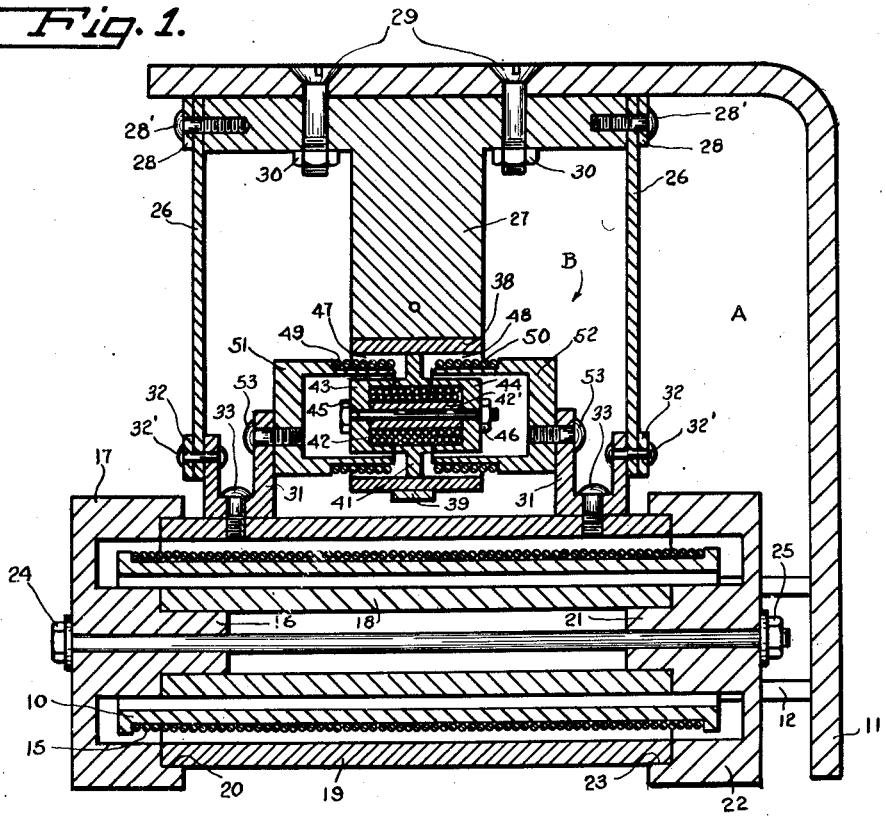

March 19, 1957  B. LITMAN  2,786,186

VARIABLE INDUCTOR

Original Filed June 14, 1951  2 Sheets-Sheet 1

INVENTOR.
BERNARD LITMAN
BY
Raymond A. Paquin
ATTORNEY.

United States Patent Office 2,786,186
Patented Mar. 19, 1957

2,786,186

VARIABLE INDUCTOR

Bernard Litman, New York, N. Y., assignor to American Bosch Arma Corporation, a corporation of New York Original application June 14, 1951, Serial No. 231,489, now Patent No. 2,744,335, dated May 8, 1956. Divided and this application February 18, 1953, Serial No. 337,561

2 Claims. (Cl. 336—119)

The present invention relates to gravity pendulums and has particular reference to a pendulum sensitive to tilts in only one plane and having self contained correction means to compensate for acceleration forces other than gravity acting on the pendulum.

This application is a division of application Serial Number 231,489, filed June 14, 1951, now Patent No. 2,744,335.

The present invention is particularly adapted for use on pendulum controlled gyroscopic devices installed on moving land, sea or air craft where the pendulums are subjected to acceleration forces other than gravity which ultimately cause inaccuracies in the gyroscopic indication if not corrected. Copending application Serial Number 738,242, filed March 29, 1947, by George Agins for Instrument Stabilization System for example, shows a stable element in which acceleration forces other than gravity acting on the control pendulums are neutralized by applying a counter torque to the pendulum pivot by a torque motor. The present invention is an improvement over the pendulum and torque motor combination there shown in which the pendulum and its correction device are united in a single unit where the correction motor armature is also the weight for the pendulum.

In accordance with the present invention, a solenoid winding is attached to the object whose tilt from the vertical in a predetermined plane is to be detected, said solenoid winding having its longitudinal axis in the tilt plane in a normally horizontal position and situated in the annular space between two mechanically coupled coaxial iron cylinders suspended from the tilting object by light flat flexible leaf springs or tapes. The leaf springs are attached to the cylinders in a manner which allows axial displacement of the cylinders and yet resists motion of the cylinders in a direction perpendicular to the predetermined plane, i. e. the axis of the cylinders is perpendicular to the plane of the leaf springs.

As the object tilts out of the vertical through a small angle with a component tilt in a predetermined plane, the iron cylinders are displaced axially with respect to the solenoid and the magnitude of the displacement provides a measure of the component tilt, when gravity alone acts on the cylinders.

However, the cylinders may also be displaced by forces other than gravity, such as that resulting from a change in speed of the craft for example, and hence the position of the cylinders does not indicate the true vertical without correction.

The solenoid winding is energized in a manner such as to apply a neutralizing force to the cylinders and thereby cause the pendulum to indicate the true vertical. The entire solenoid winding is energized from a constant alternating voltage center tapped power supply, and a signal voltage proportional in magnitude to the computed error producing force and of the same frequency as the power supply, is applied between the solenoid winding center tap and the power supply center tap. The magnetic field within the solenoid is stronger in one half of the solenoid than in the other half and the force and direction of pull on the iron cylinders are dependent, respectively, on the magnitude and phase of the signal voltage. The force of the magnetic attraction acting on the iron cylinder therefore neutralizes the external error producing force applied to the pendulum causing the pendulum to indicate the true vertical.

The preferred embodiment to be described has numerous advantages over previously used methods and devices. It requires a minimum of space for installation and is simple to construct. Bearings and their disadvantages are eliminated by the use of flexible tapes instead of rigid shafts in bearings. Other advantages will become evident in the description of the invention.

Figure 3:
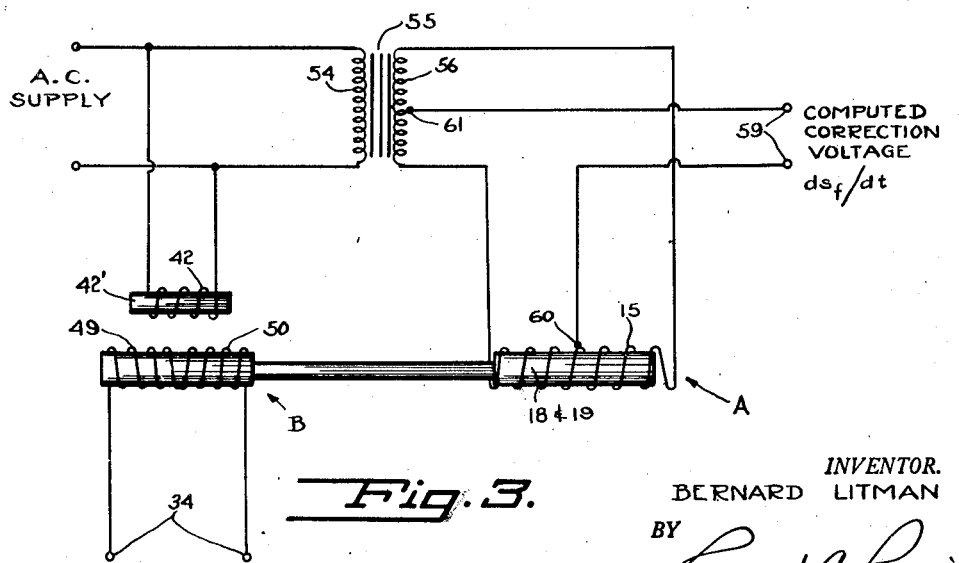
Figure 2:
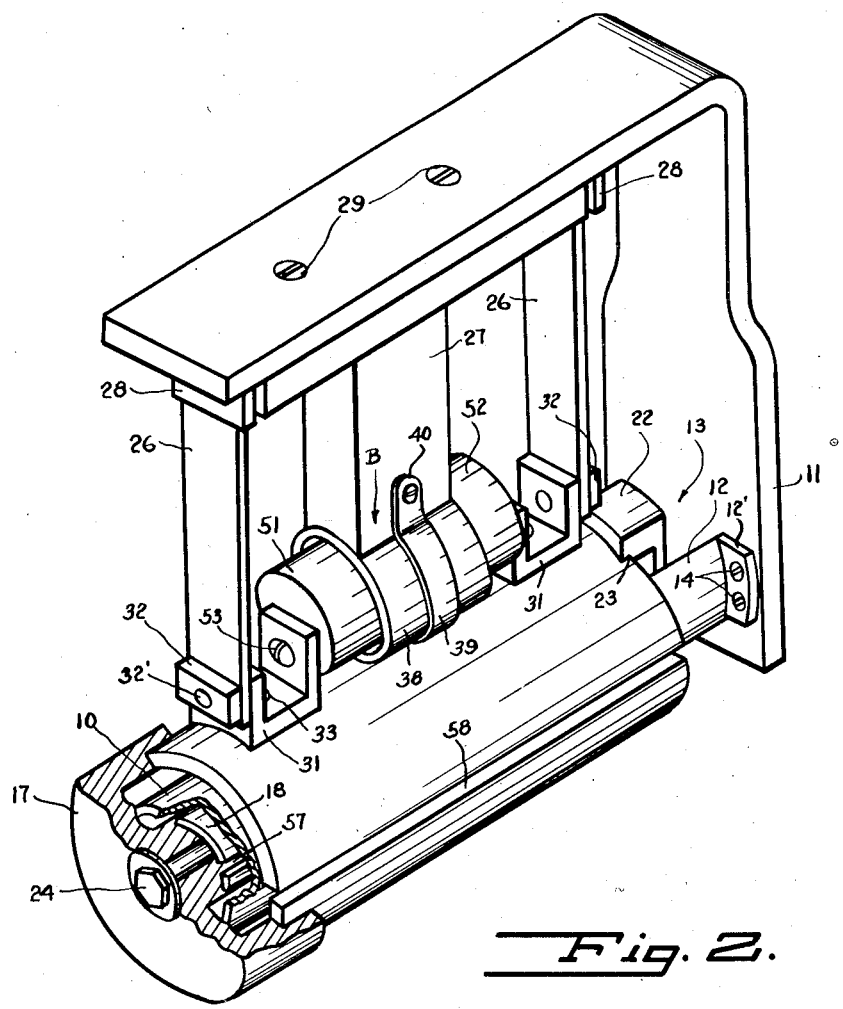

For a better understanding of the invention reference may be had to the accompanying drawings, in which Fig. 1 is a cross sectional view of the pendulum-linear force motor and its pickup device, Fig. 2 is a pictorial representation of the unit shown in Fig. 1, and Fig. 3 is a schematic wiring diagram showing the electrical connections to the unit of Fig. 1.

Turning now to Figs. 1 and 2, a cylinder 10 of non-magnetic material preferably brass is secured to frame 11 by its extensions 12 which are formed by removing a portion of cylinder 10 leaving a vertical space 13 between the extensions 12. The extensions 12 are fastened to frame 11 by screws 14 passing through the flanges 12' of extensions 12. The outer surface of cylinder 10 is recessed to receive and hold the solenoid winding 15.

The extended hub 16 of non-magnetic, preferably aluminum, end piece 17 (shown partly broken away in Fig. 2) fits into the bore of iron cylinder 18, while the iron cylinder 19, coaxial with cylinder 18 fits into recess 20 in end piece 17. The iron cylinders 18 and 19 and end piece 17 are then placed so that the cylinder 10 and solenoid 15 are situated in the annular space between cylinders 18 and 19. The hub 21 of non-magnetic, preferably aluminum, end piece 22, is inserted into cylinder 18 while cylinder 19 fits into the recesses 23 of end piece 22. End piece 22 is shaped so that it fits loosely in the vertical space 13 between extensions 12 of cylinder 10. Non-magnetic bolt 24 is passed through end piece 17, cylinder 18 and end piece 22 and nut 25 is tightened on bolt 24 to urge end pieces 17 and 22 together, thereby forcing the end pieces 17, 22 against the ends of cylinders 18, 19 in order to hold the cylinders 18, 19 in a fixed relative position. Cylinders 18 and 19 are equal in length and are shorter than solenoid 15.

The armature assembly, A, consisting of cylinders 18 and 19, end pieces 17 and 22, bolt 24 and nut 25, is suspended out of contact with cylinder 10 by the steel tapes 26 and is normally in a position where cylinders 18, 19 are substantially coaxial with and longitudinally centered with respect to solenoid 15. The upper ends of tapes 26 are fastened to frame 11 by the bolts 29 and nuts 30. The lower ends of tapes 26 are clamped to support 31 by the rectangular pieces 32 and rivets 32' while supports 31 are fastened to iron cylinder 19 by the screws 33. The rectangular pieces 28, 32 insure that the tapes 26 are tightly clamped at the edges of block 27 and supports 31 so that the length of the tapes 26 does not vary.

Armature assembly A is free to swing through a limited longitudinal displacement, i. e. in the vertical plane containing the axis of solenoid 15. Motion perpendicular to this plane is restrained by the steel tapes 26 which have the long dimension (of their cross section) at right angles to the axis of cylinder 19. However, when an excessive force, due to shock for example, is applied in the direction perpendicular to the longitudinal axis, the tapes 26 temporarily buckle and the cylinder 18 bears against the cylinder 10. When the excessive force is removed, however, the unit is again ready for operation without having suffered any permanent injury.

In operation, the displacement of frame 11 from the vertical is not more than a few degrees, as for example when secured to a stabilized gimbal ring of a vertical spin axis gyro. A novel electrical pickup device B is installed between block 27 and iron cylinder 19 to detect the displacement of the pendulum weight, i. e. the armature assembly, A, from its zero position, which is the same as the displacement of frame 11 from the vertical.

An iron cylinder 38 is secured to the block 27 by passing strap 39 under the cylinder 38 and fastening strap 39 securely to block 27 with bolt 40 and its associated nut (not shown), or by any other suitable method.

A non-magnetic circular collar 41 having a cross section resembling the letter T with the horizontal bar of the T on the inner surface and the vertical bar of the T extending outwardly, is forced into the center of cylinder 38.

Solenoid winding 42 wound on a tubular magnetic core 42' is inserted into the collar 41, and cup shaped end caps 43 and 44 are fitted over winding 42 with the inner ends meeting the axially longer portion of the collar 41. A bolt 45 is inserted through end cap 43, solenoid core 42', end cap 44, and nut 46 tightened on bolt 45, to force end caps 43 and 44 into position against collar 41 and core 42'. Thus, the circuit for the magnetic flux developed when solenoid winding 42 is energized is from core 42' through end cap 43, annular air gap 47, cylinder 38, annular air gap 48, end cap 44 back to core 42', thereby producing a substantially radial magnetic flux in the air gaps 47 and 48.

Located in the air gaps 47 and 48 are the solenoids 49 and 50 respectively wound on the non-magnetic shells 51 and 52. The shells 51 and 52 are fastened to supports 31 by screws 53, for example, and are displaced longitudinally in the air gaps 47 and 48 whenever the armature assembly A is longitudinally displaced with respect to block 27.

Solenoid winding 42 is energized by a constant alternating voltage (Fig. 3) and a substantially radial constant alternating magnetic field is produced in the air gaps 47 and 48 thereby. When pendulum assembly A is centered in the zero position, i. e. where it indicates that frame 11 is vertical, an equal voltage is induced in each winding 49 and 50, which are electrically connected in series opposition so that the voltage across the two windings 49 and 50, and made available at terminals 34 is zero. When frame 11 tilts out of the vertical the pendulum assembly A is displaced from the zero position thereby displacing solenoids 49 and 50 proportionally, so that the voltages induced in windings 49 and 50 are no longer equal, and the magnitude of the voltage at terminals 34 is proportional to the displacement of pendulum A while the phase of the voltage indicates the direction of displacement. The voltage at terminals 34 may be used to control a torque motor on the horizontal axis of the gyro in the well known manner to cause erection of the gyro spin axis into the vertical.

To describe the operation of the invention, assume that the longitudinal axis of the cylinders 10, 18, 19 is parallel to the longitudinal axis of the vessel carrying the pendulums, i. e. the pendulum is sensitive to displacements in the pitch plane. In this case a change in the forward speed of the ship causes a force proportional to the rate of change of forward speed $dS_f/dt$ to be applied to the armature assembly A, causing the assembly A to move axially resulting in an error in the indication of the true vertical. (The assembly A moves axially until the component of the gravitational force perpendicular to the plane of tapes 26 tending to return the assembly A to the normal position balances the force due to $dS_f/dt$ tending to move the assembly A away from the zero position.)

Solenoid 15 is employed to apply a correcting force to assembly A of such magnitude and direction that the forces due to accelerations other than gravity are neutralized thereby and the pendulum indicates the true vertical.

With reference to Fig. 3, solenoid 15 is energized from a center tapped constant source of voltage, illustrated in Fig. 3 as transformer 55, the primary winding 54 of which is energized from a constant alternating voltage supply, and the center-tapped secondary winding 56 of which is connected across solenoid winding 15. Those skilled in the art will recognize that a source of direct voltage may be alternatively employed to energize solenoid 15, if desired.

It has been well established in electro-magnetic theory that the magnitude of the force of pull on a magnetic core is constant when the core penetrates between 40 to 85 percent (approximately) into a solenoid and is proportional to the square of the magnitude of the magnetizing current. Also the force of pull is zero when the core is substantially centered longitudinally within the solenoid, since both halves of the solenoid apply equal and opposite forces to the core.

Thus, when solenoid 15 is energized solely by the constant exciting voltage 2V, from transformer 55 and cylinders 18 and 19 are substantially centered with respect to solenoid 15, the cores 18 and 19 are subjected to equal and opposite forces, proportional in magnitude to $V^2$ so that the assembly A assumes a position dependent only on the acceleration forces acting thereon.

Whenever the vessel undergoes a change in speed, a signal voltage E, of the same frequency as the exciting voltage and proportional in magnitude to the calculated error producing force on assembly A, i. e., proportional to $$\frac{dS_f}{dt}$$

is made available to terminals 59 (Fig. 3) from a circuit which is well known to those in the art and will not be described here. Terminals 59 are connected to center tap 60 on the solenoid winding 15 and to center tap 61 and secondary winding 56 so that the current in one half of solenoid 15 is increased and is proportional to $V+E$, while the current in the other half of solenoid 15 is decreased and is proportional to $V-E$, whence a stronger magnetic field exists in one half of solenoid 15 than in the other half. The phase of the signal voltage at terminals 59 depends on whether the vessel is accelerating or decelerating and the phase relationship between the signal and exciting voltages determines which half of solenoid 15 produces the stronger magnetic field. In operation the half of solenoid 15 which is toward the forward part of the craft produces the stronger magnetic field during acceleration of the craft while the other, or after half of solenoid 15 produces the stronger magnetic field during deceleration of the craft. Thus when the forces due to acceleration tend to move the assembly A toward the rear of the craft, the forward half of solenoid 15 is the more strongly energized half and tends to draw the iron cylinders 18 and 19 forward with a force proportional to $(V+E)^2$ while the after half of solenoid 15 tends to draw iron cylinders 18 and 19 towards the rear with a force proportional in magnitude to $(V-E)^2$. The total force on cylinders 18 and 19 is proportional to the difference between $(V+E)^2$ and $(V-E)^2$ or 4EV, which is proportional to E since 4V is a constant. Since the direction of this force is forward the acceleration force due to the change in speed is neutralized so that the assembly A remains stationary and indicates the true vertical. Similarly, when the craft decelerates and the assembly A tends to move forward the rear half of solenoid 15, more strongly energized than the forward half, tends to draw the iron cylinders 18 and 19 toward the rear with a force which neutralizes the deceleration force so that the pendulum indicates the true vertical.

In a similar fashion computed corrections may be applied to the pitch pendulum to counteract the effects of skid, and to the roll pendulum to counteract the effects of Coriolis acceleration, change in ships course and the east west motion of own ship. The derivation of the computed correction voltages for these effects is contained in application Serial Number 738,242 previously referred to.

From the foregoing it will be seen that I have provided means for obtaining all of the objects and advantages of the invention.

I claim:

1. In a device of the character described, a support, a magnetic cylinder connected to said support, a first solenoid concentric and coaxial with said magnetic cylinder and supported therein by a monmagnetic ring, a magnetic armature and magnetic end caps for said solenoid, annular air gaps between said end caps and the adjacent portions of said magnetic cylinder, and a pair of solenoids substantially coaxial with said first solenoid and said cylinder and movable relative thereto simultaneously and to the same extent, said pair of solenoids being located in said air gaps the output of said solenoids being connected in series whereby their difference indicates the position of said solenoids with respect to said support.

2. In a device of the character described, a support, a magnetic cylinder connected to said support, a first solenoid concentric and coaxial with said magnetic cylinder and supported therein by a nonmagnetic ring, a magnetic armature and magnetic end caps for said solenoid, annular air gaps between said end caps and the adjacent portions of said magnetic cylinder, and a pair of solenoids substantially coaxial with said first solenoid and said cylinder and movable relative thereto simultaneously and to the same extent, one of said pair of solenoids being located in the air gap between one of said end caps and said cylinder and the other of said pair of solenoids being located in the air gap between the other of said end caps and said cylinder the output of said solenoids being connected in series whereby their difference indicates the position of said solenoids with respect to said support.

References Cited in the file of this patent

UNITED STATES PATENTS

| | | |
|---|---|---|
| 2,452,862 | Neff | Nov. 2, 1948 |
| 2,586,010 | Divoll | Feb. 19, 1952 |
| 2,621,224 | Priest | Dec. 9, 1952 |
| 2,627,062 | Graham | Jan. 27, 1953 |

FOREIGN PATENTS

| | | |
|---|---|---|
| 354,704 | Germany | June 15, 1922 |